Oct. 18, 1966                J. DE LA GARZA                3,279,743
NON-DRIP FAUCET VALVE
Filed Dec. 27, 1963
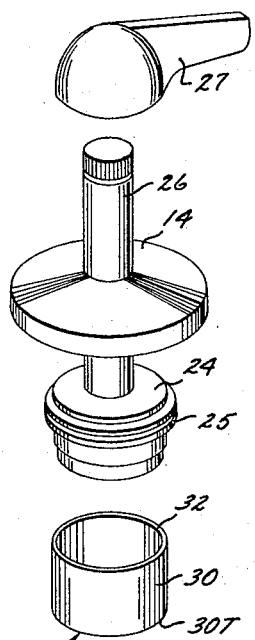
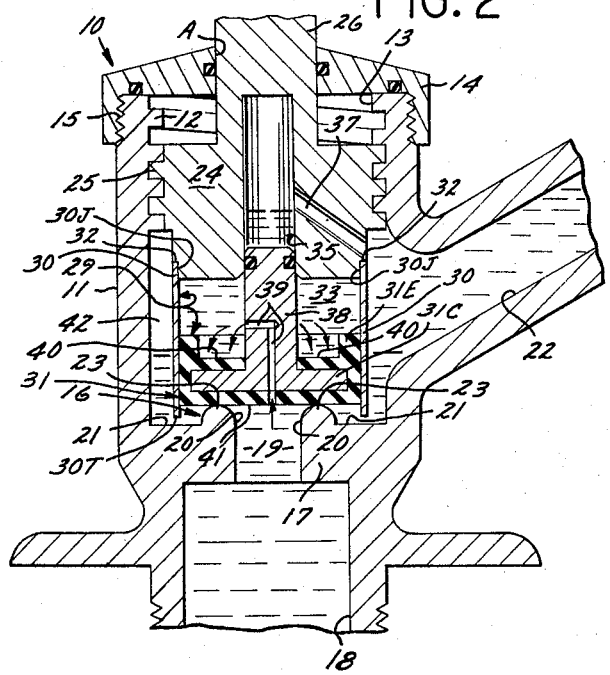
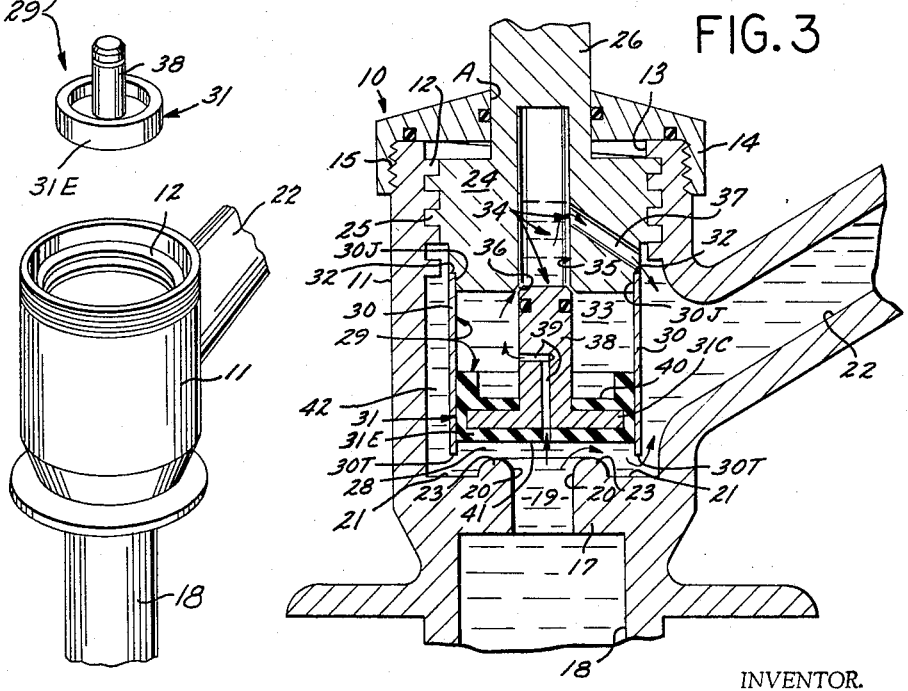
INVENTOR.
J. DE LA GARZA United States Patent Office 3,279,743
Patented Oct. 18, 1966

3,279,743
NON-DRIP FAUCET VALVE
Jesus de la Garza, 1116 N. Ditman Ave.,
Los Angeles, Calif.
Filed Dec. 27, 1963, Ser. No. 333,992
11 Claims. (Cl. 251—43)

The present invention relates generally to the valve art and, more particularly, to a novel non-drip faucet valve primarily adapted for use in a faucet valve housing whereby to control the outflow of water (or any other liquid or fluid) from an outlet, nozzle, or spout connected thereto.

The non-drip feature of the novel faucet valve of the present invention is provided by a novel type of fluid-pressure-expandable valve means carried by a valve-actuating member between said valve-actuating member and a valve seat means and arranged to be in interior communication with pressurized water (or any other pressurized liquid or fluid) whereby to automatically expand said fluid-pressure-expandable valve means in a space defined between said valve-actuating member and said valve seat means and to sealingly engage a sealing portion of said valve seat means in a manner preventing outflow of water (or any ther liquid or fluid) past the sealingly engaged fluid-pressure-expandable valve means and the sealing portion of said valve seat means whenever the valve-actuating member is within a predetermined distance of said valve seat means.

The above-described arrangement compensates for the customary valve leakage which occurs in conventional hot water faucet valves (or valves for other hot liquids or fluids) because of contraction of various parts of the valve and actuating means from their sealing relationships when initially closed after a flow of hot water (or other liquid) has passed through the valve. This normally occurs in prior art faucet valves as a result of cooling of said parts of the valve and the actuating means therefor. However, such leakage will not occur in the novel valve of the fluid-pressure-expandable valve means will maintain an effective sealing engagement of the valve means with respect to the sealing portion of the valve seat means even after such cooling of the water (or other liquid or fluid), the valve seat means, the valve means, and the valve-actuating member occurs in the device of the present invention when used as a hot water faucet valve (or valve for other hot liquids or fluids). However, whenever the valve-actuating member is moved beyond a predetermined distance from the valve seat means, a novel by-pass means effectively communicates the pressurized interior of the fluid-pressure-expandable valve means with an outlet pipe, nozzle, or spout whereby to allow egress of the pressurized water (or other liquid or fluid) from the interior of said fluid-pressure-expandable valve means so that the greater inlet pressure of the water (or other liquid or fluid) against the outside or the upstream side of said fluid-pressure-expandable valve means will effectively collapse said fluid-pressure-expandable valve means and will move one movable portion thereof away from the sealing portion of the valve seat means in a manner such as to allow controlled egress of water (or other liquid or fluid) past the collapsed fluid-pressure-expandable valve means and the valve seat means into the outlet pipe, nozzle, or spout.

With the above points in mind, it is an object of the present invention to provide a novel non-drip faucet valve of the type referred to above, which will effectively maintain a non-leaking closed and sealed relationship of the fluid-pressure-expandable valve means with respect to the valve seat means irrespective of temperature and/or pressure changes.

It is a further object of the present invention to provide a novel non-drip faucet valve of the character referred to above, which includes a fluid-pressure-expandable valve means arranged, whenever the valve-actuating member is in one position which may be termed a closed position, to be fully expanded by interior water, liquid, or fluid under pressure whereby to seal off the sealing portion of the valve seat means and arranged, whenever the valve-actuating member is in another position, which may be termed an open position, to become effectively collapsed whereby to effectively unseat a movable elastomeric piston portion of said fluid-pressure-expandable valve means from the valve seat means to allow the free substantially unimpeded passage of water or other liquid or fluid through said valve seat means to an outlet pipe, nozzle, or spout.

It is a further object of the present invention to provide a novel non-drip valve of the type referred to hereinbefore which can be used wherever such a non-leaking valve would be advantageous and which is not specifically limited to a faucet valve, although this is one exemplary and highly advantageous application of the improved non-drip valve of the present invention.

It is an object of the present invention to provide a novel non-drip valve of the character referred to above, embodying any or all of the various features thereof referred to above, either generically or specifically, and either individually or in combination, whereby to provide a valve having the advantages referred to above and which is of extremely simple, inexpensive, foolproof and long-lasting construction such as to be conducive to the mass manufacture, distribution, and widespread use thereof.

Further objects are implicit in the detailed description which follows hereinafter (which is to be construed as exemplary only, and not as specifically limiting the invention), and such objects will be apparent to persons skilled in the art after a careful study of the accompanying drawing and the detailed description which follows hereinafter.

For the purpose of clarifying the nature of the present invention, one exemplary embodiment is illustrated in the hereinbelow-described figures of the accompanying single drawing sheet and is described in detail hereinafter.

FIG. 1 is an exploded perspective view illustrating the various elements of one exemplary embodiment of the invention in vertically exploded relationship.

FIG. 2 is an enlarged, fragmentary, partially broken away, vertical sectional view, taken on a substantially central vertical plane, of the exemplary embodiment of the present invention of FIG. 1 and shows the interior details of one form of the valve seat means, the fluid-pressure expandable valve means, the valve-actuating member, the communication means for providing fluid under pressure for expanding said fluid-presure-expandable valve means, and the by-pass means for allowing egress of said pressurized fluid from within said fluid-pressure-expandable valve means when said valve-actuating member is moved away from said valve seat means to a valve-open position. In this view, all of the elements illustrated are in a valve-closed relationship whereby to prevent the pressurized flow of water (or other liquid or fluid) from the inlet conduit or pipe to the outlet conduit pipe, nozzle or spout.

FIG. 3 is an enlarged fragmentary sectional view generally similar to FIG. 2 but illustrates the apparatus after the valve-actuating member has been operated in a manner such as to be moved to a valve-open position whereby to effectively collapse the fluid-pressure-expandable valve means and whereby to cause the elastomeric piston portion thereof to be moved by inlet water pressure away from the valve seat means so as to effectively place the entire valve structure in valve-open relationship allowing the pressurized flow of water (or other liquid or fluid)

from the inlet conduit or pipe to the outlet conduit, pipe, nozzle or spout.

Referring to the figures for illustrative purposes, one exemplary embodiment of the invention is shown wherein it takes a typical exemplary form comprising a hollow valve housing means, indicated generally at 10, including a substantially cylindrical upstanding hollow valve housing body portion 11, which is provided with interior thread means 12 and which has an open top 13 adapted to be closed by a closure cap means 14. The closure cap means 14 may be threadably engaged with the exterior of the valve housing body portion or member 11 in the region indicated at 15 or may be otherwise affixed with respect thereto. The cap member 14 of the hollow valve housing 10, in the specific example illustrated, is provided with an upwardly directed exit aperture A, the purpose of which will be described in detail hereinafter.

The lower end of the hollow valve housing means 10 is provided with apertured valve seat means, indicated generally at 16, which comprises a transverse disk-like member 17 carried across the bottom end of the hollow valve housing body portion 11 of the valve housing means 10 and across the upper end of the inlet conduit or pipe means 18. Said transverse disk-like member 17 is provided with a central inlet aperture means 19 communicating an inflow portion 20 of the valve seat means 16 with the pressurized fluid (usually water) in the inlet pipe or conduit means 18.

Said valve seat means 16 is provided with an outflow portion 21 communicable with the outlet pipe or conduit means 22, and is additionally provided with an intervening sealing portion comprising an annular sealing ridge or bead means 23 between said inflow portion 20 and said outflow portion 21.

The hollow valve housing means 10 carries therein the valve-actuating member 24, which is provided with exterior threads 25 threadedly engaged with the interior threads 12 of the hollow valve housing body portion 11 of the valve housing means 10 whereby relative rotation of the valve-actuating member 24 by means of the upwardly extending stem portion 26, which sealingly passes through the exit aperture A, and by means of the actuating handle means 27 carried thereby, will effectively vertically move said valve-actuating member 24 either toward or away from the valve seat means 16 and in spaced opposition with respect thereto, whereby to define therebetween a valve recess, such as that indicated at 28 (best shown in FIG. 3).

The valve recess 18 is provided with fluid-pressure-expandable valve means, indicated generally at 29, having a first portion 30, comprising a hollow cylinder portion carried by the bottom end of the valve-actuating member 24, and having a second or lower portion comprising a piston 31 slidably carried by said cylinder portion 30 and abutable with the valve seat means 16 when in valve-closed relationship.

In the exemplary form of the invention illustrated, said first valve portion 30, as mentioned above, comprises a hollow cylinder having one end 32 sealingly carried by the bottom end of said valve-actuating member 24 as indicated by the sealing fastening junction 30J, which may comprise any desired type of mechanical fastener which will provide an effective seal or which may comprise welding, brazing or junction by caulking or mastic material or the like.

Also, in the exemplary form illustrated, said hollow cylinder comprising said first valve portion 30 extends downwardly from the valve-actuating member 24 toward the valve seat means 16 and has an open terminal or bottom end 30T remote from the valve-actuating member 24 and normally adjacent to said valve seat means 16.

Also, in the exemplary form of the invention illustrated, said second valve portion 31, as mentioned above, comprises a piston portion which includes a circular disk-shaped rigid inner core 31C covered by a circular disk-shaped outer elastomeric portion 31E whereby to effectively comprise an elastomeric circular disk-shaped piston portion which is generally designated by the reference numeral 31 and which is telescopically slidably and sealingly mounted within said hollow cylinder comprising said first valve portion 30 and which defines therewith a hollow interior expansion chamber 33 within said fluid-pressure-expandable valve means, indicated generally at 29; said hollow interior expansion chamber 33 being of variable volume depending upon the vertical position of the second valve portion comprising said elastomeric piston 31 relative to said hollow cylinder comprising said first valve portion 30.

The invention also includes by-pass means defining communication passage means positioned for interior communication with said hollow interior expansion chamber 33 within said fluid-pressure-expandable valve means 29 when the valve-actuating member 24 is moved away from the valve seat means 16 beyond a predetermined distance so as to be in what might be termed a valve-open relationship, thus allowing pressurized fluid within the expansion chamber 33 to escape, which will allow inlet fluid pressure to force said elastomeric piston portion comprising said second valve portion 31 to be slidably telescopically and sealingly moved away from the valve seat means 16 toward the valve-actuating member 24 into a valve-open relationship such as is clearly shown in FIG. 3.

Said by-pass means is generally designated by the reference numeral 34 and is normally closed when the valve-actuating member 24 is within a predetermined distance of the valve seat means 16, which might be termed valve-closed relationship or position, such as is clearly shown in FIG. 2.

Said by-pass means 34 comprises and defines communication passage means, indicated generally at 35, and carried by the valve-actuating member 24, and provided with an egress aperture means 36 and an outflow passage 37 communicating with the outflow pipe or spigot 22.

Said by-pass means 34 also includes a rod 38 mounted within the expansion chamber 33 and extending upwardly thereacross toward the valve-actuating member 24 and into said egress aperture means 36 of said valve actuating member 24. In the exemplary form illustrated, said rod 38 actually has its lower end integrally carried by said interior metal disk-like core 31C of said elastomeric circular disk-shaped piston portion comprising said second valve portion 31 and extends upwardly therefrom toward said valve-actuating member 24 and into said egress aperture means 36 in a manner somewhat similar to the cooperative relationship of a needle valve structure or other functional equivalent. In other words, the arrangement is such that the upper end of the rod 38, which effectively comprises a reduced-size by-pass portion by reason of the bevel 38', cooperates with the tapered or flared egress aperture means 36 so as to effectively comprise a variable orifice, dump, or by-pass valve means which will be varied from completely closed to completely open by very slight downward vertical reciprocation of the upper end of the rod 38 relative to the tapered or flared egress aperture means 36—the fully closed relationship of said elements being clearly shown in FIG. 2 and the fully open relationship thereof being clearly shown in FIG. 3.

It will readily be understood that normally when the apparatus is in valve-closed position or relationship as clearly shown in FIG. 2, pressurized inlet water is in communication, through the inlet aperture means 12, with the inflow portion 20 of the valve seat means 16 and also is in interior communication with the hollow interior valve expansion chamber 33 through the communication means comprising the aperture 39 in said second valve portion, comprising said piston 31, and in said rod 38; said aperture 39 being substantially smaller in effective cross-sectional area than the effective cross-sectional area of said egress aperture means 36 (and, also, passage 37) when in fully open relationship as shown in FIG. 3.

Thus, the pressure within the valve expansion chamber 33 acting against the valve-closing area 40 produces a greater net valve-closing force across the piston 31 than the valve-opening force produced by the inlet water pressure acting against the smaller area valve-opening surface 41. This effectively causes the second valve portion, comprising the elastomeric piston 31, to sealingly engage the sealing ridge or bead means 23 and to maintain the valve apparatus in closed relationship whenever the valve-actuating member 24 is within a predetermined distance of the valve seat means 16 in the manner clearly illustrated in FIG. 2.

However, when said valve-actuating member 24 is moved upwardly away from the valve seat means 16 beyond said predetermined distance and into a valve-open position such as is clearly shown in FIG. 3, the by-pass means 34 allows the interior water pressure within the valve expansion chamber 33 to escape through the egress aperture means 36 and outflow passage, groove, or channel 37, to the outlet pipe or conduit 22. This allows the greater inlet water pressure acting against the bottom surface of the elastomeric piston portion comprising the second valve portion 31 to effectively slidably telescopically move same upwardly relative to the hollow cylinder comprising the first valve portion 30 whereby to effectively collapse the fluid-pressure-expandable valve means 29 in a manner such as to allow a substantial flow of pressurized water through the inlet aperture means 19, the inflow portion 20, over the now disengaged sealing ridge or bead means 23, and through the outflow portion 21 and into the outlet pipe or conduit means 22.

It should be noted that the flow of water through the apparatus, when in the valve-open position shown in FIG. 3, is facilitated by exterior distribution annular channel means 42 extending around the exterior of the fluid-pressure-expandable valve means 29 and a portion of the valve-actuating member 24.

It should be noted that the structure of the apparatus is such that progressive upward movement of the valve-actuating member 24 effectively increases the size of the through-opening between the inlet pipe 18 and the outlet pipe 22 whereby to correspondingly vary the flow of water (or other liquid or fluid medium) therethrough.

It should be noted that the reference, either directly or by implication, throughout this specification and the appended claims, to expansion and contraction of the fluid-pressure-expandable valve means, generally designated at 29 in the figures of the drawing, is not to be construed as directly relating to a comparison of the volume of the expandable chamber 33 as shown when the apparatus is in the valve-closed position in FIG. 2 and as shown when the apparatus is in the valve-open position in FIG. 3. In other words, it will be noted that the volume of said expansion chamber 33 is actually larger when the apparatus is in the valve-open relationship shown in FIG. 3 than when the apparatus is in the valve-closed relationship shown in FIG. 2. Therefore, it might superficially appear that the fluid-pressure-expandable valve means 29 has been effectively expanded from the valve-closed relationship of the parts of the apparatus shown in FIG. 2 in order to achieve the valve-open relationship of the parts shown in FIG. 3, and it might also superficially seem that said expansion chamber 33 has been effectively collapsed from the valve-open relationship of the parts of the apparatus shown in FIG. 3 in order to achieve the valve-closed relationship of the parts shown in FIG. 2. However, this is not the "expansion" and "contraction" which lies at the heart of the inventive concept of the present invention and which is precisely opposite to the superficial enlargement and reduction of the size of the variable volume interior chamber 33 referred to above.

In other words, the fluid-pressure-expansion of the fluid-pressure exandable valve means 29 referred to throughout this specification and claims, and comprising an important feature of the present invention, occurs when the various elements of the apparatus are moved from the valve-open relationship shown in FIG. 3 into the valve-closed relationship shown in FIG. 2, and actually occurs just at the end of this valve-closing operation when the downwardly threadedly advanced valve-actuating member 24 reaches a position where the egress aperture means 36 carrier therein begins to be closed off by engagement with the tapered upper end 38' of the rod 38. When this occurs the expansion chamber 33, which prior to this movement has had a low pressure therein, now begins to build up interior pressure by reason of the controlled entry of high pressure inlet water through the communication passage 39 from the aperture 19 of the valve seat means and the high pressure inlet water pipe 18. This built-up of interior pressure within the expansion chamber 33 at just about the end of the valve-closing operation, effected by threadedly advancing the valve-actuating member 24 downwardly, causes a small degree of positive expansion of the expansion chamber 33 and causes the elastomeric piston 31 to move downwardly a small distance, so as to provide an extremely firm and positive sealing engagement of the bottom portion of the elastomeric material 31E of said piston 31 with the sealing ridge 23— perhaps even to a degree such as to slightly compress said elastomeric rubber portion 31E of said piston 31. It is this small expansion at the end of the valve-closing operation which is referred to throughout the specification and claims and, conversely, the contraction of said fluid-pressure-expandable valve means 29 referred to throughout the specification and claims, and comprising an important feature thereof, occurs at almost the end of the valve-opening operation which is effected by threadedly retracting the valve-actuating member 24 upwardly from the valve-closed position of the elements of the invention as shown in FIG. 2. During the first portion of this operation it will be understood that the volume of the expansion chamber 33 will actually increase since the piston portion 31 will remain in the closed sealed relationship shown in FIG. 2 despite the fact that the valve-actuating member 24 and the cylinder 30 move upwardly. This is so because the interior of the expansion chamber 33 contains relatively high pressure water. However, as soon as the valve-actuating member 24 has moved upwardly sufficiently to cause the egress aperture means 36 to begin to open, the high pressure water within the expansion chamber 33 will begin to bleed out through said egress aperture means 36 to a degree greater than the inflow of high pressure water through the communication passage means 39 and the pressure within the expansion chamber 33 will drop, which will allow the high pressure inlet water of the inlet aperture 19 of the valve seat means 16 to move the elastomeric piston 31 upwardly a small distance until the outflow from the expansion chamber 33 through the egress means 36 and the inflow into the expansion chamber 33 from the communication passage means 39 are in balance. It is during this short period of time that it can be said that the volume of the expansion chamber 33 has effectively contracted by a small amount.

The important aspect of the present invention comprises the small magnitude expansion feature mentioned above which brings about a very firm and positive seating of the bottom of the elastomeric piston 31 on the sealing ridge 23 at the conclusion of the valve-closing operation.

The above definition of what is meant by the terms "expansion" and "contraction" of the fluid-pressure-expandable valve means 29, insofar as they pertain to the important inventive concept which lies at the heart of the present invention, are to be applicable and to be understood as comprising the meaning of such terms, or any related terms, throughout the specification and appended claims.

It should be noted that device of the present invention is particularly well adapted for faucet valves, but is not specifically so limited. Indeed, it may be employed for any valve where the highly advantageous non-drip feature of the present invention is desired. Furthermore, the relative positioning and configuration of inlet and outlet conduit means and the orientation of the various elements of the valve means, valve seat means, and valve-actuating member (and connecting stem, handle, etc.) may be modified substantially within the basic spirit and scope of the present invention. Additionally, the by-pass means and/or the communication means may be modified to a considerable extent within the broad scope of the present invention, both as to configuration and as to mounting.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. A non-drip valve comprising: a hollow valve housing means having inlet means and outlet means connected thereto and having an interior chamber provided with and controllably movably receiving a controllably movable valve-actuating member; effectively apertured valve seat means positioned in spaced opposition to said valve-actuating member and defining therebetween a valve recess, said valve seat means including an inflow portion in effective communication with said inlet means, an outflow portion for communication with said outlet means, and intervening sealing means between said inflow and outflow portions; fluid-pressure-expandable valve means carried by said valve-actuating member in said valve recess between said valve-actuating member and said valve seat means and having a first portion comprising a hollow cylinder portion having one end sealingly carried by said valve-actuating member and extending from said valve-actuating member toward said valve seat means and having an open terminal end remote from said valve-actuating member and adjacent to said valve seat means, said fluid-pressure-expandable valve means also having a second portion comprising an elastomeric circular disk-shaped piston portion telescopically slidably and sealingly mounted within said hollow cylinder portion and defining therewith a hollow interior expansion chamber within said fluid-pressure-expandable valve means provided with communication means in communication with said effectively apertured valve seat means, said second valve portion comprising said elastomeric piston portion being positionable adjacent to said valve seat means and being forcibly sealingly abuttable with said sealing means as a result of interior fluid pressure within said expansion chamber; and by-pass means defining communication passage means positioned for interior communication with said expansion chamber within said valve means when said valve-actuating member is moved away from said valve seat means beyond a predetermined distance, thus allowing the pressurized fluid within the expansion chamber to escape and thus allowing inlet fluid pressure to force said second valve portion comprising said elastomeric piston portion to be slidably telescopically and sealingly moved away from said valve seat means toward said valve-actuating member.

2. A non-drip valve as defined in claim 1, wherein the inner surface of said second valve portion comprising said elastomeric piston portion sealingly slidably and telescopically mounted within said first valve portion comprising said hollow cylinder portion has a greater surface area exposed to interior fluid pressure when said valve means is in closed relationship to said valve seat means than the area on the opposite side thereof exposed to inlet fluid pressure from an adjacent to said effectively apertured valve seat means.

3. A non-drip valve as defined in claim 1, wherein said by-pass means comprises an egress aperture means in said valve-actuating member and a rod mounted within said expansion chamber and extending thereacross toward said valve-actuating member and into said egress aperture means of said valve-actuating member, said rod having a by-pass portion cooperable with said egress aperture means and sealingly extending thereinto when said valve-actuating member and said second valve portion are in closed positions, and said by-pass portions being spacedly cooperably positioned in open by-passing relationship with respect to said egress aperture means when said valve-actuating member and said second valve portion are in open positions.

4. A non-drip valve as defined in claim 1, wherein said by-pass means comprises an egress aperture means in said valve-actuating member and a rod mounted within said expansion chamber and extending thereacross toward said valve-actuating member and into said egress aperture means of said valve-actuating member, said rod having a by-pass portion cooperable with said egress aperture means and sealingly extending thereinto when said valve-actuating member and said second valve portion are in closed positions, and said by-pass portion being spacedly cooperably positioned in open by-passing relationship with respect to said egress aperture means when said valve-actuating member and said second valve portion are in open positions; said communication means comprising an aperture in said second valve portion smaller in effective cross-sectional area than said egress aperture means and communicating said expansion chamber with inlet fluid pressure from and adjacent to said effectively apertured valve seat means.

5. A non-drip valve as defined in claim 1, wherein said by-pass means comprises an egress aperture means in said valve-actuating member and a rod carried by said second valve portion comprising said elastomeric piston portion and positioned within said expansion chamber extending thereacross toward said valve-actuating member and into said egress aperture means of said valve-actuating member, said rod having a reduced-size by-pass portion cooperable with said egress aperture means and sealingly extending thereinto when said valve actuating member and said second valve portion are in closed positions, and said reduced-size by-pass portion being spacedly cooperably positioned in open by-passing relationhip with respect to said egress aperture means when said valve-actuating member and said second valve portion are in open positions.

6. A non-drip valve as defined in claim 1, wherein said by-pass means comprises an egress aperture means in said valve-actuating member and a rod carried by said second valve portion comprising said elastomeric piston portion and positioned within said expansion chamber extending thereacross toward said valve-actuating member and into said egress aperture means of said valve-actuating member, said rod having a reduced-size by-pass portion cooperable with said egress aperture means and sealingly extending thereinto when said valve-actuating member and said second valve portion are in closed positions, and said reduced-size by-pass portion being spacedly cooperably positioned in open by-passing relationship with respect to said egress aperture means when said valve-actuating member and said second valve portion are in open positions; said communication means comprising an aperture in said second valve portion smaller in effective cross-sectional area than said egress aperture means and communicating said expansion chamber with inlet fluid pressure from and adjacent to said effectively apertured valve seat means.

7. A non-drip valve as defined in claim 1, wherein said valve-actuating member is provided with outflow channel means in communication with said outflow portion of said valve seat means and also in communication with said outlet means.

8. A non-drip valve as defined in claim 1, wherein said valve-actuating member has an extended stem portion provided with an actuating handle means exterior of said hollow valve housing means.

9. A non-drip valve as defined in claim 1, wherein said valve-actuating member has an extended stem portion provided with an actuating handle means exterior of said hollow valve housing means, said hollow valve housing means being provided with an exit aperture means sealingly rotatively engaging said stem portion of said valve-actuating member.

10. A non-drip valve as defined in claim 1, wherein said valve-actuating member has an extended stem portion provided with an actuating handle means exterior of said hollow valve housing means, said hollow valve housing means being provided with a threadedly engageable and disengageable closure member extending across said interior chamber and having a centrally positioned exit aperture means sealingly rotatively engaging said stem portion of said valve-actuating member.

11. A non-drip valve as defined in claim 1, wherein said by-pass means comprises an egress aperture means in said valve-actuating member and a rod carried by said second valve portion comprising said elastomeric piston portion and positioned within said expansion chamber extending thereacross toward said valve-actuating member and into said egress aperture means of said valve-actuating member, said rod having a reduced-size by-pass portion cooperable with said egress aperture means and sealingly extending thereinto when said valve-actuating member and said second valve portion are in closed positions, and said reduced-size by-pass portion being spacedly cooperably positioned in open by-passing relationship with respect to said egress aperture means when said valve-actuating member and said second valve portion are in open positions; said communication means comprising an aperture in said second valve portion and in said rod carried by said second valve portion comprising said elastomeric piston portion and communicating said expansion chamber with inlet fluid pressure from and adjacent to said effectively apertured valve seat means, said aperture having an effective cross-sectional area of less than one-half the effective cross-sectional area of said egress aperture means.

References Cited by the Examiner
UNITED STATES PATENTS

| | | | |
|---|---|---|---|
| 1,605,344 | 11/1926 | Handy | 251—44 |
| 2,211,237 | 8/1940 | Langdon | 251—43 X |
| 2,361,694 | 10/1944 | Langdon | 251—44 X |

M. CARY NELSON, *Primary Examiner.*

H. KLINKSIEK, *Examiner.*